Sept. 17, 1935.  C. BIRDSEYE ET AL  2,014,550
REFRIGERATING APPARATUS
Filed Jan. 20, 1931  4 Sheets-Sheet 2
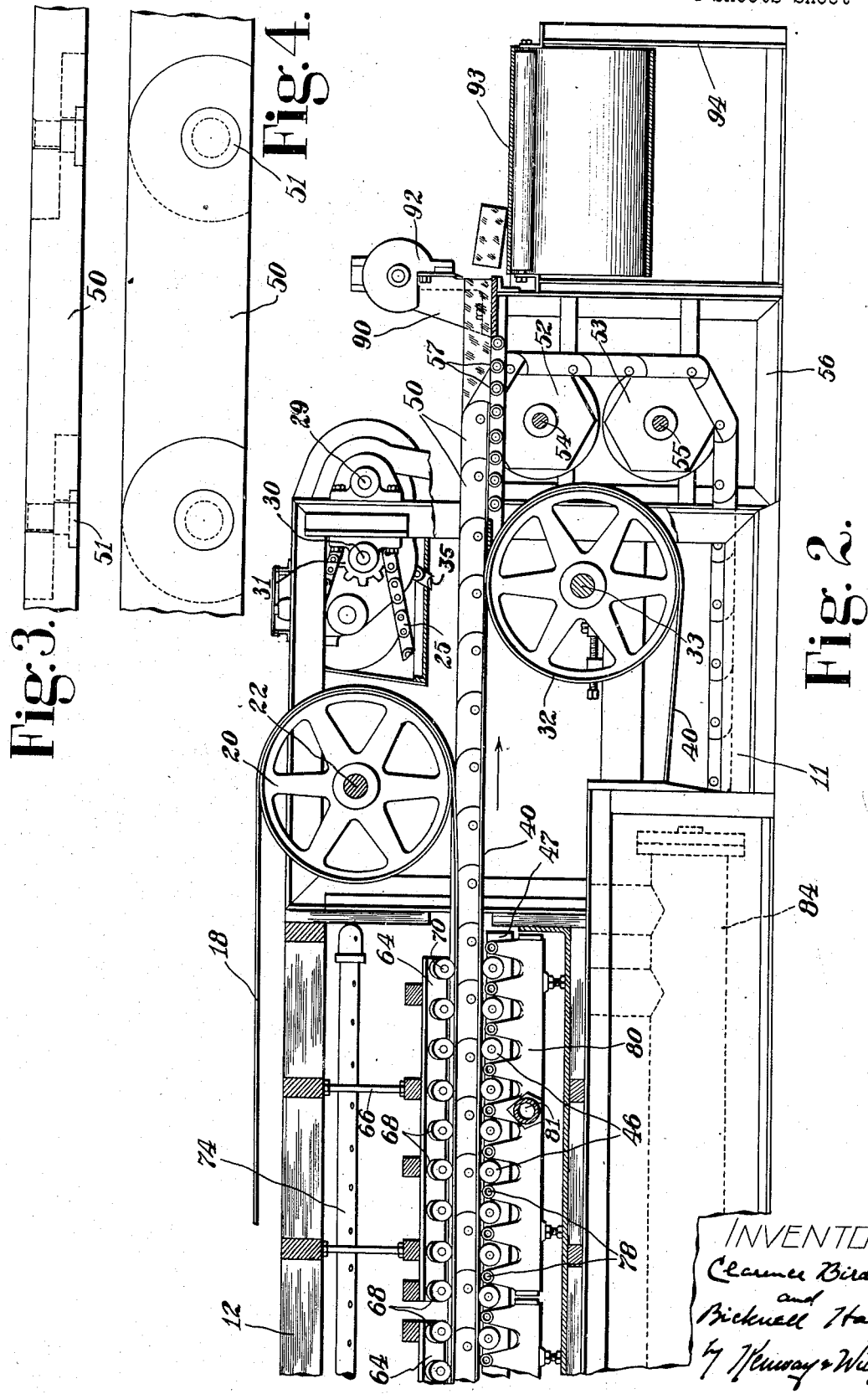

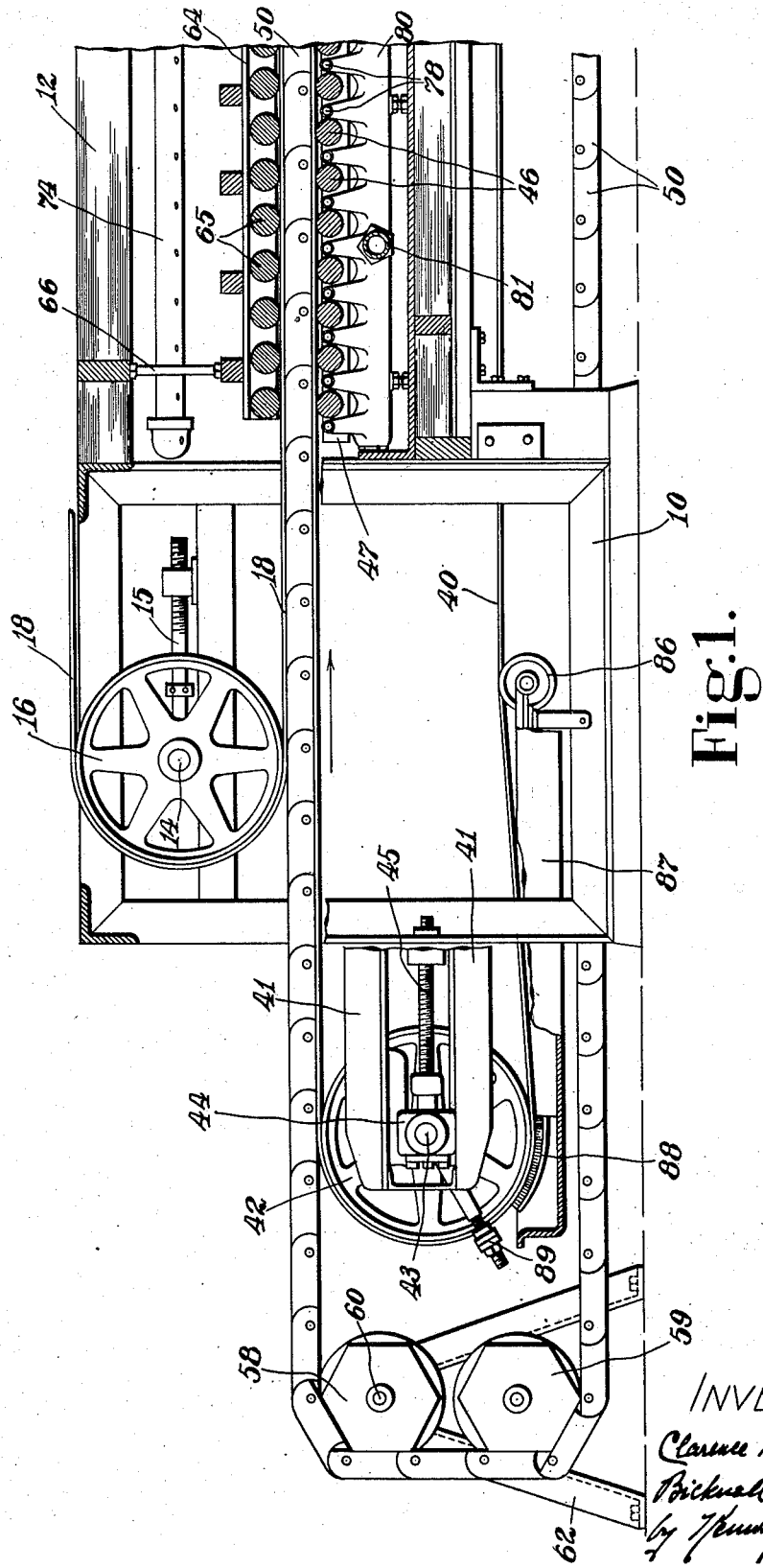

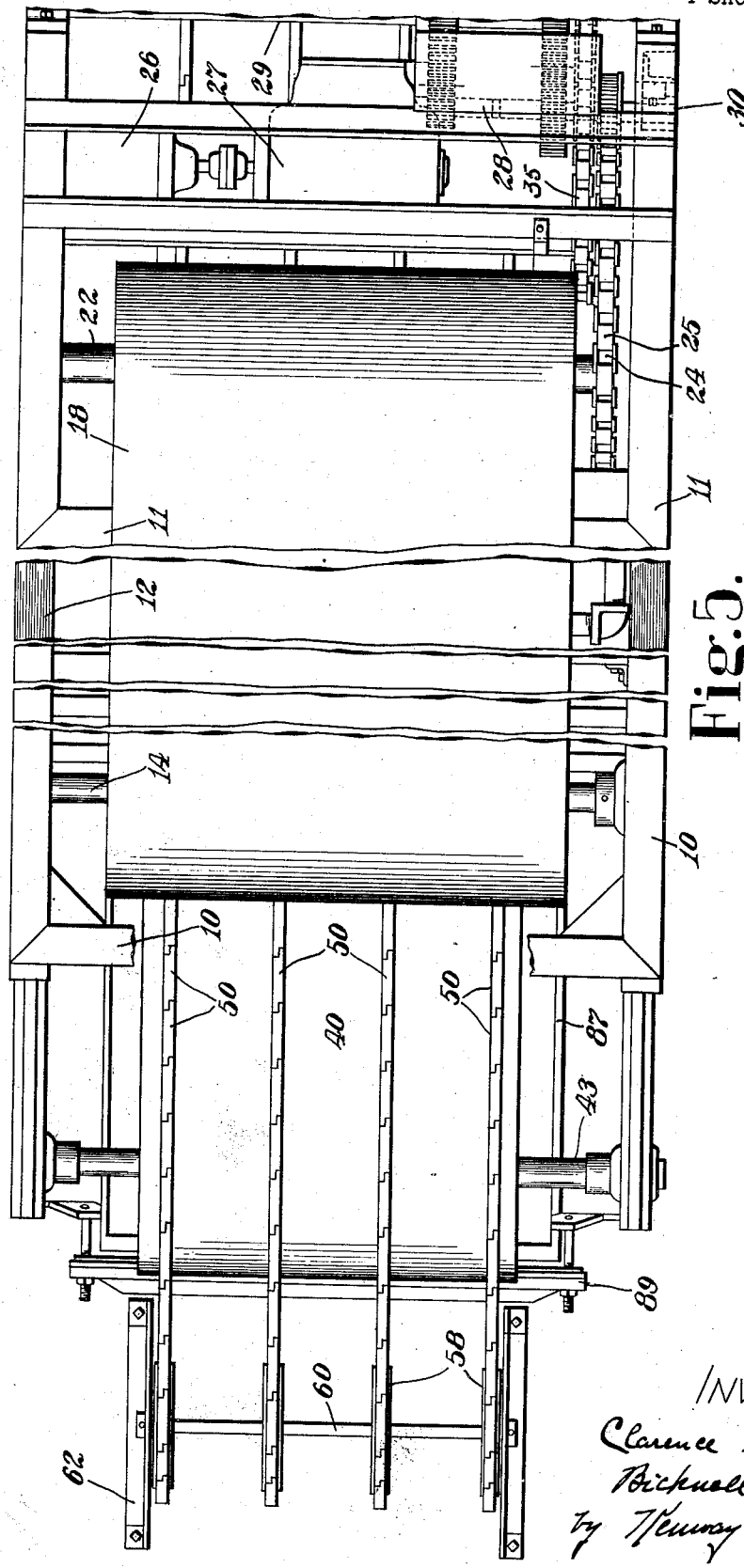

Sept. 17, 1935.  C. BIRDSEYE ET AL  2,014,550
REFRIGERATING APPARATUS
Filed Jan. 20, 1931  4 Sheets-Sheet 4

Patented Sept. 17, 1935

2,014,550

UNITED STATES PATENT OFFICE 2,014,550

REFRIGERATING APPARATUS

Clarence Birdseye and Bicknell Hall, Gloucester, Mass., assignors to Frosted Foods Company, Inc., Dover, Del., a corporation of Delaware Application January 20, 1931, Serial No. 509,992

24 Claims. (Cl. 62—104)

This invention relates to refrigerating apparatus of the type used for freezing, quick-freezing, or congealing food products of various kinds, and more particularly to that type of apparatus employing conveyor bands or belts as a carrier for the product and also as heat-conducting mediums. In the prior patent of Clarence Birdseye, No. 1,773,081, granted August 12, 1930, is disclosed an apparatus of this general character and in one aspect the present invention consists in the further development of the invention therein disclosed with the object of extending its field of use. In another aspect our invention consists broadly in refrigerating apparatus of the conveyor belt type so organized as to handle liquid or semi-liquid products.

In belt conveyors as heretofore constructed and employed in the refrigeration of food products, the cooperating heat-conductive belts have been arranged to engage the product with a predetermined degree of pressure regardless of its dimensions or other characteristics. As distinguished from such construction, the present invention contemplates refrigerating apparatus wherein the approach of the belts toward each other is positively limited. The action of the conveyor belts in feeding and positioning the product for treatment may, therefore, be effected without applying pressure or more than a limited pressure to the product between them and it is, consequently, possible in the novel apparatus of our invention to handle in strip or ribbon form a liquid or semi-liquid product which would otherwise be objectionably flattened or entirely squeezed out from between the belts.

Various means may be provided for determining or establishing the paths of the conveyor belts although, as herein shown, spacer members interposed between the two belts are relied upon for this function. This construction and arrangement is advantageous in that the spacer members may conveniently be employed also to confine the product within the area of the belts or between the margins thereof, thus serving the double purpose of limiting the relative approach of the cooperating belts and of supplementing them in the formation of molds or containers for the product.

As herein shown, the spacer members are of the general character of link belts, being articulated so that they may be guided in endless paths and directed accurately between the inner faces of the conveyor belts. The articulated spacing members preferably are moved at the same rate as the conveyor belts and one desirable manner of accomplishing this result is to arrange the conveyor bands to grip and carry forward the spacer members between them. The articulated spacing members are substantially fluid-tight in their construction and make fluid-tight contact with the opposed faces of the conveyor belts.

As will be understood, the conveyor bands or belts serve also as heat-conductive members and that when these are refrigerated by a liquid refrigerant, such as brine, it is desirable to deflect the same away from the product contained between the belts and from the inner product-engaging faces of the belts. In accordance with a further feature of our invention, accordingly, means are provided for engaging the margin of the upper belt and temporarily deflecting it throughout its passage of the refrigerating zone or while it passes beneath the brine-supplying ducts. Preferably and as herein shown, the deflecting means comprises a series of obliquely-disposed rollers which, on account of the resilient nature of the conveyor belt, are effective to spring its margin downwardly throughout a portion of its path without excessive loss by friction. This feature is of general application to refrigerating apparatus of the conveyor belt type and may be usefully employed in connection with such apparatus as heretofore made as well as with apparatus of the type herein shown.

These and other features of the invention will be best understood and appreciated from the following description of a preferred embodiment thereof, selected for purposes of illustration and shown in the accompanying drawings, in which Fig. 1 is a view of the receiving end of the apparatus in side elevation, partly in section;

Fig. 2 is a similar view of the delivering end of the apparatus;

Fig. 3 is a plan view of a section of the spacer member on an enlarged scale;

Fig. 4 is a corresponding view in side elevation;

Fig. 5 is a top plan view of the apparatus with sections broken out;

Figure 6:
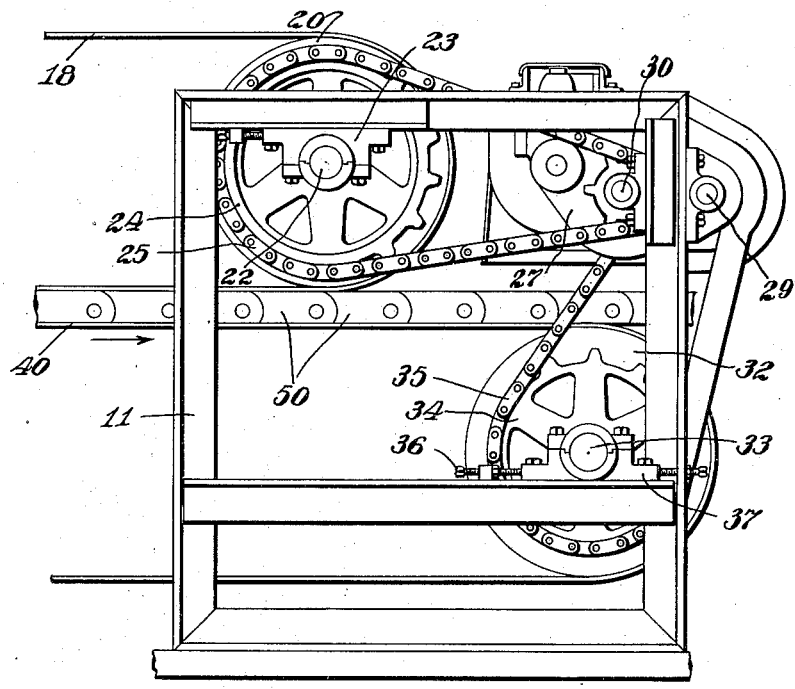
Fig. 6 is a view in side elevation of the driving mechanism unit.

The apparatus herein illustrated comprises two endless heat-conductive belts 18 and 40 driven in adjacent parallel paths with a definite predetermined spacing which is positively maintained by a series of elongated spacing members comprising links 50. The heat-conductive belts and the spacer members are moved longitudinally at the same rate of speed with the material to be congealed between them while a liquid refrigerating medium is supplied to the outer faces of both heat-conductive belts. The belts and the spacers cooperate to form a series of parallel elongated molds of fixed dimensions adapted to receive a liquid or semi-liquid material, and in these molds the material is congealed as it is conveyed through the apparatus. Accordingly, liquid or semi-liquid material may be delivered at one end and discharged at the other end of the apparatus as a solid and continuous cake of frozen material. With this preliminary explanation of its general mode of operation, we will proceed to a more detailed description of the apparatus.

The frame of the apparatus is built up of sections of convenient length of standard structural shapes, timber and insulating material, and includes two structural steel end sections 10 and 11 within or upon which the drums for the endless belts are journaled. The end sections 10 and 11 are connected by an insulated intermediate section 12 containing the refrigerating chamber and the brine-circulating system. The intermediate section may be of any desired length determined in accordance with the product or material to be treated and the space available for the apparatus.

The upper belt 18 is arranged to run over an idle drum 16 and a driven drum 20. The idle drum 16 is mounted upon a transverse shaft 14 which is journaled in the upper portion of the end frame 10 in bearings, not shown, which may be longitudinally adjusted to regulate the tension of the belt 18 by means of an adjusting screw 15. The driven drum 20 is mounted upon a transverse shaft 22 journaled in bearings 23 adjustably secured to the upper members of the end frame 11. At one end the shaft 22 carries a large sprocket wheel 24 which is driven by a chain 25 from the driving unit, which will be presently described. The provision for adjustment of the bearings 23 is for the purpose of adjusting the tension of the driving chain 25 and after this has been properly determined the idle drum 16 is adjusted to regulate the tension of the belt 18.

The lower belt 40 is arranged to run upon an idle drum 42 and a driven drum 32. The idle drum 42 is mounted upon a transverse shaft 43 journaled in adjustable bearing boxes 44 which are held between guide members 41 projecting outwardly from the end frame 10. The bearing boxes 44 are connected to and positioned by adjusting screws 45 disposed between the guide members 41 and by which the tension of the lower belt may be regulated.

The driven drum 32 is mounted upon a transverse shaft 33 mounted in adjustable bearings 37 which are supported upon one of the transverse members of the end frame 11. At its other end the shaft 33 carries a large sprocket wheel 34 arranged to be driven by a chain 35 from the driving unit. Adjusting screws 36 are provided for the bearings 37 and, similarly to the arrangement of the upper belt, the bearings 37 may be shifted to adjust the tension of the driving chain 35, after which the idle drum 42 may be adjusted to regulate the tension of the lower belt 40.

The driving unit is mounted in the end frame 11 and comprises a motor 26 connected through a universal joint to a reducing gear mechanism 27. The main shaft 28 of the latter is connected through suitable gearing to a transverse shaft 29 mounted in bearings secured to the end frame 11 and carrying at its outer end a sprocket wheel, not shown, for driving the chain 35 which actuates the lower drum shaft 33, revolving it in a clockwise direction so that the lower belt moves toward the right in the upper portion of its path. The driven shaft 29 is also provided with gear connections to a second transverse shaft 30 journaled in bearings secured to the interior of the end frame 11 and which, consequently, is rotated in the opposite direction to the shaft 29. The shaft 30 carries at its outer end a sprocket wheel 31 by which it drives the chain 25 leading to the upper driven drum shaft 22. Since the direction of rotation of the shaft 30 is opposite to that of the shaft 29, the drum 20 will be rotated in an anti-clockwise direction and the upper belt 18 moved toward the right in the lower portion of its path. The gearing described is so designed that the speed of both belts 18 and 40 is equal.

The lower belt, as will be seen from the drawings, is considerably longer than the upper belt and its drums 42 and 32 are placed outwardly at either end of the apparatus as compared to the drums 16 and 20 of the upper belt. This arrangement facilitates presentation to the upper surface of the lower belt of the material to be treated and similarly facilitates removal of the frozen material at the right-hand or delivering end of the apparatus. Within the refrigerating chamber, which is included in the intermediate frame 12, the lower belt is supported in the upper portion of its path by a series of parallel transversely-disposed rollers 46 which are journaled at either end in an angle iron 47 rigidly secured to one of the longitudinal members 48 of the frame. The rollers 46 are located sufficiently close together as to constitute collectively a substantially rigid support for the belt 40 in this portion of its path and, consequently, they serve to determine positively the location of the path of the belt and to maintain it permanently horizontal and substantially tangent to the supporting drums 32 and 42.

The spacer members ride upon the upper surface of the belt 40 throughout the upper portion of its path. As herein shown, these are four in number and are so located as to divide the width of the belt into three substantially equal longitudinal zones, as shown in Fig. 5. Each spacer member comprises a plurality of links 50, best shown in Figs. 3 and 4. Each link is substantially rectangular and is reduced at each end to one-half the thickness of its body portion. Adjacent links are connected by a headed transversely-disposed stud 51 located unsymmetrically in the links and considerably closer to the lower edge than to the upper edge thereof. Each stud 51 passes through the overlapping reduced portions of adjacent links and the end surfaces of the links are curved on radii concentric with the axis of the stud. This construction results in a flexible, substantially fluid-proof joint, permitting the spacer member to pass about suitable guide rolls at the ends of its path and to lie flat upon the surface of the belt 40 in passing through the refrigerating apparatus. The action of the links in passing over their guide pulleys is well shown in Figs. 1 and 2 and, by reference to Fig. 5, it will be seen that they form in effect four parallel walls equally spaced from each other across the upper surface of the belt 40.

Each of the four spacer members is provided with individual guide pulleys. At the receiving end of the apparatus, the spacer members pass about hexagonal disks or drums 58 and 59, the guide disks 58 being mounted in a transverse shaft 60 journaled in an auxiliary frame 62 which also supports the shaft for the lower disks 59. The disks 58 and 59 are located beyond or outside the idle drum 42 for the lower belt 40 and guide the spacer members in a path parallel to and upon the surface of the belt. The spacer members are guided at the delivery end by a similar series of hexagonal disks 52 and 53 mounted on shafts 54 and 55 respectively which are journaled in an auxiliary frame 56 secured to the outer end of the end frame 11. These disks are so located as to receive the spacer members in the plane of the upper surface of the belt 40 and to guide them in their passage about and beyond the driven drum 42 of the lower belt 40. The auxiliary frame 56 carries in its upper surface a series of idle rolls 57 which are disposed in position to receive the frozen product as it is advanced beyond the belt 40.

The upper belt 18 is arranged to be held throughout the lower portion of its path firmly in contact with the upper edge of the spacer members cooperating therewith, as already explained, to form closed elongated molds of definite dimensions. To this end a series of weighted roller frames are arranged to engage the belt 18 throughout the lower portion of its path and to press it firmly into contact with the spacer members. Each frame 64 is made up of longitudinally-disposed angle irons and cross members. The rolls 65 are journaled at opposite ends in the angle irons of the frame 64 while the whole frame is held against longitudinal movement by vertical bolts 66 connected to its cross members. The frames may be weighted as desired and it will be apparent that the series of rolls 65, arranged as they are with relatively close spacing, constitute collectively an antifriction support maintaining the upper belt 18 in contact with the spacer members and confining the belt to movement in a straight line path definitely determined by the height of the spacer members. It will be apparent also that the weight of the frames 64 causes the two driven belts 18 and 40 firmly to grip the spacer members between them so that the latter are carried along by the belts in their movement through the apparatus.

Figure 7:
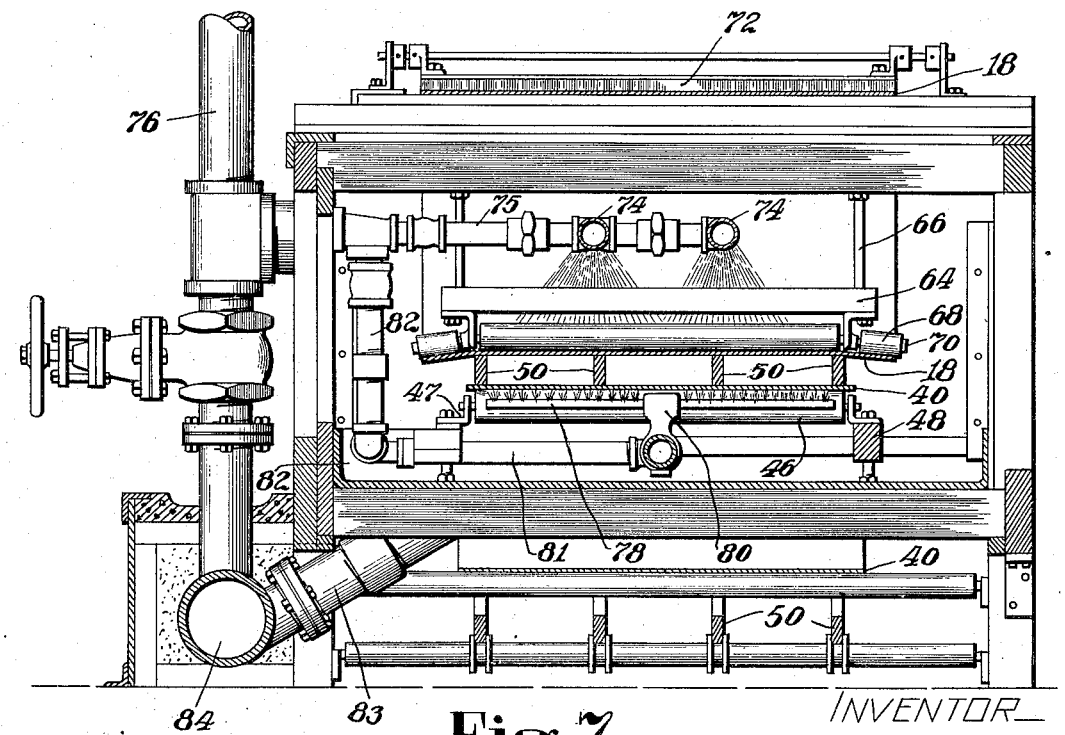
Fig. 7 is a view of the apparatus in transverse section.

The upper belt 18 is substantially wider than the lower belt 40, as well shown in Fig. 7, and is disposed symmetrically with respect thereto so that it overlaps the lower belt at each edge. In order to direct moisture upon the upper belt outwardly and away from the product contained between the two belts, deflecting rollers 68 are provided which engage the margin of the upper belt 18 and deflect it downwardly outside the spacer members 50. The deflecting rollers 68 are mounted on angularly-disposed spindles 70 which project outwardly from the angle iron members of the frames 64. A series of these deflecting rollers is provided along both sides of the frames 64 so that the edges of the belt 18 are deflected throughout its passage through the refrigerating chamber of the intermediate frame 12. Both belts, it will be understood, are of flexible, resilient material, such as nichrome steel. The edges of the belt 18, therefore, are normally flat throughout the path of the belt except where they are engaged and deflected by the rollers 68 and upon passing beyond the deflecting rollers immediately resume their flat condition.

A liquid refrigerant, such as calcium chloride brine, is continuously supplied to the outer surfaces of the belts during their passage through the refrigerating chamber. To this end, a pair of longitudinally-disposed spray pipes 74 is arranged to extend throughout the length of the refrigerating chamber above the upper belt, being perforated so as to direct a divergent spray downwardly upon the belt 18. The spray pipes 74 are connected by a transverse pipe 75 to the main supply pipe 76 by which the refrigerated brine is conducted to the apparatus from a suitable refrigerating machine.

Brine is supplied to the lower surface of the lower belt 40 within the refrigerating chamber by a series of transverse spray pipes 78 which are arranged in groups in parallel in association with a number of manifold members 80. The manifold members 80 are adjustably mounted beneath the belt 40 and are supplied with brine by a transverse pipe 81 leading through a riser 82 and pipe 75 to the supply pipe 76.

The manifold members 80 are arranged end to end in the lower part of the refrigerating chamber and within a shallow tank 82 which constitutes the floor of the refrigerating chamber and in which is collected the brine as it passes from the belts. The tank 82 is drained through an inclined pipe 83 to a horizontal pipe or drum 84 extending parallel to the refrigerating chamber, and from this the used brine is returned to the refrigerating machine. The brine is thus used in a continuous cycle process, being supplied at a temperature of approximately −45° F. through the pipe 76 from the refrigerating machine, taking up heat from the material to be frozen through the heat-conductive belts, and then being recirculated and again refrigerated.

The upper belt 18 may be provided with a cleaning brush 72, as shown in Fig. 7, located at any convenient position along the top of the apparatus. The lower belt 40, as shown in Fig. 1, is arranged to pass over an idle roller 86 and is then deflected into a shallow tank 87 with which is associated a cleaning brush 88 and a scraper 89. These cooperate to clean the belt of frost or other material which may be frozen thereto in use and to wash and disinfect the belt. For this purpose the tank 87 may contain relatively warm chlorinated salt water or the like.

At the delivering end of the apparatus the auxiliary frame 56 is provided with an upstanding bracket 90 carrying a reciprocating knife mechanism 92 by which the continuous strip or board of frozen material leaving the machine is cut up into blocks of the desired length. These blocks conveniently may be delivered to a transverse belt conveyor 93 supported by a frame 94 adjacent to the delivering end of the apparatus. It will be understood that the rollers 57 do not extend continuously across the apparatus but are arranged in separate series which permit the passage of the links 50 of the spacing belts.

The apparatus is herein shown as being used for freezing a liquid or semi-liquid product, such as orange juice, partially frozen ice cream, or other slush material. It its passage through the machine, the soft moist semi-liquid product is converted into a continuous solid frozen bar or strip and this, in turn, is divided at the delivering end of the apparatus into separate cakes, which may be packaged at once for distribution and sale.

In the operation of the apparatus, the two belts 18 and 40 are driven at a uniform speed from left to right, engaging and carrying with them in their movement the four link belt spacing members which, in the space between the two bands, cooperate to form three elongated molds of equal width. Calcium chloride brine is supplied continuously within the refrigerating chamber to the upper surface of the upper belt throughout the lower portion of its path and to the under surface of the lower belt throughout the upper portion of its path. The product to be refrigerated is supplied to the left-hand end of the apparatus by being poured or otherwise delivered upon the surface of the belt 40 between the spacing belts 50. It is then carried toward the right beneath the upper belt 18 and in its passage through the refrigerating chamber while contained in the molds above described is converted into parallel solid bars. As the frozen bars emerge from between the two belts, they are carried forward upon the lower belt 40 and then advanced across the rollers 57 at the delivering end of the apparatus. The continuous bars pass beneath the knife of the mechanism 92, which is timed to act so as to divide the bars into cakes of convenient size for distribution. In Fig. 2 a cake is represented as having been just severed from the end of a frozen bar.

While we have described the apparatus of our invention as particularly adapted for handling liquid or semi-liquid food products, it will be understood that it may be employed with equal advantage in the treating of many non-solid food products such, for example, as hamburg steak or sea loaf, or other products which may be conformed upon the belt to the molds constituted thereon by the spacing members.

Having thus described our invention, what we claim as new and desire to secure by Letters Patent is:

1. Refrigerating apparatus comprising endless impervious belts movable in adjacent paths with parallel opposed faces containing between them material to be congealed, means for positively limiting the approach of the belts throughout their length toward each other, whereby the material, regardless of its consistency, may be molded to a predetermined thickness by the belts, and means for supplying a refrigerant to the outer faces of the belts.

2. Refrigerating apparatus comprising flat co-operating heat-conductive belts, movable with their faces opposed in parallel planes to convey and simultaneously to congeal material presented between them, a positive spacer member interposed at all times between the inner faces of the belts, and means for supplying a refrigerant to their outer surfaces.

3. Refrigerating apparatus comprising cooperating heat-conductive belts, means for driving said belts at equal speed in parallel paths, whereby the product to be chilled may be engaged over substantial areas upon opposite sides, a spacing element interposed between the belts and movable therewith, and means for cooling the belts.

4. Refrigerating apparatus comprising cooperating heat-conductive belts movable in adjacent paths with material to be congealed contained between flat parallel faces, elongated spacer members disposed along the edge of one of the belts and movable therewith, and means for cooling the belts.

5. Refrigerating apparatus comprising cooperating heat-conductive belts movable in adjacent paths, an intermediate spacer member arranged to be gripped between said belts and carried by them in their movement, and means for supplying a refrigerant to the outer faces of said belts.

6. Refrigerating apparatus comprising cooperating heat-conductive belts movable in endless paths with parallel adjacent portions, a flexible spacer member guided for movement in a path exterior to that of one of said belts and arranged to be engaged between said belts throughout a portion of its path, and means for supplying a refrigerant to the belts.

7. Refrigerating apparatus comprising flat oppositely-disposed heat-conductive belts, a plurality of elongated spacer members interposed between the belts forming therewith fluid-tight molds of predetermined thickness, and means for refrigerating material contained within the molds.

8. Refrigerating apparatus comprising horizontally-disposed belts arranged one above the other, a plurality of spacer members interposed between the belts and constituting parallel vertical walls forming with the belts a series of closed molds, means for driving the belts with the spacer members between them, and means for supplying a refrigerant to the belts.

9. Refrigerating apparatus comprising cooperating heat-conductive belts guided for movement in the same direction in adjacent paths, the lower belt extending beyond the upper belt so as to expose a portion of its upper surface, intermediate fluid-confining members movable with the lower belt upon said exposed surface and also between the two belts, and means for supplying a refrigerant to the belts.

10. In refrigerating apparatus having heat-conductive belts, a spacer member comprising elongated links pivotally connected at points below their longitudinal axis and having concentrically curved close-fitting ends.

11. In refrigerating apparatus having upper and lower heat-conductive belts movable in adjacent paths, the provision of means located adjacent to an edge of the upper belt for engaging the same and deflecting it out of the plane of the belt.

12. Refrigerating apparatus having, in combination, upper and lower heat-conductive belts movable in adjacent paths, and edge-deflecting means located throughout a portion of the path of the upper belt for deflecting its edge while passing through that portion of its path.

13. Refrigerating apparatus having, in combination, upper and lower heat-conductive belts of resilient material arranged to be moved in adjacent paths in normally flat condition, and means for engaging the margin of the upper belt and springing it downwardly during its movement in a portion of its path.

14. Refrigerating apparatus having, in combination, upper and lower heat-conductive belts and obliquely-disposed rollers for engaging and deflecting the margin of the upper belt in its movement throughout a portion of its path.

15. Refrigerating apparatus having, in combination, contiguous heat-conductive belts movable in superposed relation with the upper belt overlapping the lower, and means for deflecting the overlapping margin of the upper belt.

16. Refrigerating apparatus having, in combination, heat-conductive belts movable in superposed relation with the upper overlapping the lower, an interposed spacer member located adjacent to the margin of the lower belt, and means for bending downwardly the margin of the upper belt outside said spacer member.

17. Refrigerating apparatus comprising opposed impervious belts arranged to be advanced in parallel relation and refrigerated at the same time, means for confining a moisture-containing food product between the margins of one of the belts, and an intermediate partition for separating the product longitudinally so that it issues from between the belts in distinct frozen bars.

18. Refrigerating apparatus comprising cooperating heat-conductive belts positively limited throughout their lengths, independently of an interposed product, to movement in parallel paths of predetermined spacing, fluid-tight walls for confining a non-solid product in continuous strip form within the area of said belts, and means for supplying a fluid refrigerating medium to the outer faces of the belts.

19. Refrigerating apparatus comprising cooperating heat-conductive belts movable in adjacent paths, fluid-tight means for positively limiting the approach of one belt toward the other throughout its length, for shaping a non-solid product into a continuous strip and for confining the product against being squeezed from between the belts, and means for delivering a fluid refrigerant to the outer faces of the belts.

20. Refrigerating apparatus for food products, comprising a flat-faced heat-conductive member, longitudinal walls disposed at the edges of said member and serving to confine a non-solid food product in strip form thereon, a flexible heat-conductive belt cooperating with said member to enclose the product and being weighted so that it is pressed into firm engagement with said longitudinal walls, and means for supplying a refrigerant to the outer face of said belt.

21. Refrigerating apparatus comprising cooperating conveyor belts presenting flat opposed faces maintained in parallel relation, means for refrigerating the belts whereby material engaged between said faces may be congealed, and positively acting means for confining said belts throughout their length to movement in paths spaced a predetermined distance apart.

22. Refrigerating apparatus comprising imperforate heat-conductive members having flat opposed faces maintained in parallel relation and being movable to convey material to be congealed between them, positively acting means for confining said members throughout their length to movement in paths of fixed location, and means for congealing said material while so held and conveyed.

23. Refrigerating apparatus comprising endless impervious belts confined, throughout a part of their length, to movement in predetermined relatively spaced paths with their inner faces positively limited throughout their lengths to a predetermined spacing and maintained in parallel relation to contact upon opposite sides articles to be congealed, and means for applying a refrigerant to the outer faces of said belts to congeal articles engaged therebetween.

24. Refrigerating apparatus comprising flat cooperating heat-conductive belts presenting parallel faces, means for supporting one of said belts for movement in a predetermined path, means for positively limiting the approach of the other belt throughout its length toward said supported belt, thereby adapting the belts to confine between them a continuous strip of non-solid comestible material, and means for supplying a refrigerant to the outer faces of the belts.

CLARENCE BIRDSEYE.
BICKNELL HALL.